(12) United States Patent
Davis

(10) Patent No.: US 10,285,334 B1
(45) Date of Patent: May 14, 2019

(54) TARP APPARATUS FOR CATCHING TRIMMED PLANT LEAVES AND BRANCHES

(71) Applicant: Ricky Daniel Davis, Carrollton, TX (US)

(72) Inventor: Ricky Daniel Davis, Carrollton, TX (US)

( * ) Notice: Subject to any disclaimer, the term of this patent is extended or adjusted under 35 U.S.C. 154(b) by 233 days.

(21) Appl. No.: 15/356,271

(22) Filed: Nov. 18, 2016

Related U.S. Application Data

(60) Provisional application No. 62/321,508, filed on Apr. 12, 2016.

(51) Int. Cl.
*A01G 13/02* (2006.01)
*A01G 3/08* (2006.01)
*B08B 17/04* (2006.01)
*B65F 1/14* (2006.01)

(52) U.S. Cl.
CPC ............... *A01G 3/08* (2013.01); *B08B 17/04* (2013.01); *B65F 1/14* (2013.01); *B65F 2240/138* (2013.01)

(58) Field of Classification Search
CPC ............ A01G 13/0237; A01G 13/0281; A01G 13/04; A01G 13/043; A01G 2013/046; A47G 33/045
USPC ..................................... 47/32, 29.7, 31.1, 30
See application file for complete search history.

(56) References Cited

U.S. PATENT DOCUMENTS

| | | | | |
|---|---|---|---|---|
| 4,799,520 A | * | 1/1989 | Blackburn | A47G 33/045 206/423 |
| 5,426,887 A | * | 6/1995 | Spencer | A01G 13/04 47/29.2 |
| 5,593,743 A | * | 1/1997 | Baker | A47G 33/04 150/154 |
| 5,809,689 A | * | 9/1998 | Mathur | A01G 13/0237 47/30 |
| 6,698,135 B1 | * | 3/2004 | Robbins | A01G 13/043 47/23.3 |
| 7,497,048 B2 | * | 3/2009 | Bakowski | A01G 13/043 135/100 |

OTHER PUBLICATIONS

"PrunEze for Pruning! Pruning Accessory", published on May 10, 2010, link available at http://www.youtube.com/watch?v=t45gL-AvgSM.
"PrunEze 5' Pruning Tarp", available on Oct. 21, 2016, link available at https://www.m.amazon.com/PrunEze-PrunEze5-5-Pruning-Tarpldp/B00510H7HQ.

* cited by examiner

*Primary Examiner* — Trinh T Nguyen
(74) *Attorney, Agent, or Firm* — Plager Schack LLP

(57) ABSTRACT

A foldable tarp apparatus with enhanced strength to collect trimmed leaves and branches of a plant for a disposal is provided. The tarp apparatus includes a foldable circular sheet having a central opening and an outer edge, the circular sheet having a slit extending from an edge of the central opening to the outer edge of the circular sheet, and a plurality of spine members coupled to the circular sheet, each spine member extending radially on the circular sheet and positioned equidistant from adjacent spine members. The central opening of the circular sheet receives the base of the plant therethrough to secure the circular sheet on the ground area surrounding the plant, thereby permitting the circular sheet to collect the trimmed leaves and branches of the plant.

4 Claims, 3 Drawing Sheets

TARP APPARATUS FOR CATCHING TRIMMED PLANT LEAVES AND BRANCHES

RELATED APPLICATION

The application claims priority to provisional patent application U.S. Ser. No. 62/321,508 filed on Apr. 12, 2016, the entire contents of which is herein incorporated by reference.

BACKGROUND

The embodiments herein relate generally to devices and methods for cutting and disposing trimmed branches, twigs and leaves from plants.

Gardeners, landscapers and homeowners often trim plants such as trees, shrubs, and the like, to maintain the shape and good health of the plants. These individuals prune twigs, branches and leaves by using a variety of tools such as shears and saws. The trimmed items fall to the ground, which creates a burden for the individual during the cleanup process. In particular, individuals have to manually collect the trimmed twigs, branches and leaves by hand, which is time consuming. Further, individuals have to bend over to collect the trimmed items. This often places each individual's back in an awkward position, which increases the likelihood the individual suffers an injury to his/her back or other body area.

Several tarps in the field have been wrapped around the base of a plant to collect and remove trimmed twigs, branches and leaves from the plant. In particular, the PrunEze tarp accessory comprises a circular tarp with a central opening and a slit extending from the outer edge to the central opening. This permits the tarp accessory to be wrapped around the base of the plant. Trimmed twigs, branches and leaves that fall on the tarp accessory are removed from the site by pulling the tarp away from the plant's base and disposed accordingly. However, the PrunEze tarp and other tarps in the field have several limitations. Specifically, these tarps lack stability when disposed on the ground. Wind can blow these tarps off the ground and away from plants during the trimming process, thereby making the tarps difficult to use.

As such, there is a need in the industry for a tarp apparatus with enhanced stability that addresses the limitations of the prior art, which effectively collects trimmed branches, twigs and leaves from a plant, and permits the easy disposal of the trimmed items.

SUMMARY

A foldable tarp apparatus with enhanced strength for use in covering a ground area surrounding a base of a plant is provided. The tarp apparatus is configured to collect trimmed leaves and branches of the plant for a disposal. The tarp apparatus comprises a foldable circular sheet comprising a central opening and an outer edge, the circular sheet comprising a slit extending from an edge of the central opening to the outer edge of the circular sheet, and a plurality of spine members coupled to the circular sheet and configured to enhance stability of the sheet when disposed on the ground area, each spine member in the plurality of spine members extending radially on the circular sheet and positioned equidistant from adjacent spine members in the plurality of spine members, wherein the central opening of the circular sheet is configured to receive the base of the plant therethrough to secure the circular sheet on the ground area surrounding the plant, thereby permitting the circular sheet to collect the trimmed leaves and branches of the plant.

BRIEF DESCRIPTION OF THE FIGURES

The detailed description of some embodiments of the invention will be made below with reference to the accompanying figures, wherein the figures disclose one or more embodiments of the present invention.

DETAILED DESCRIPTION OF CERTAIN EMBODIMENTS

Figure 1:
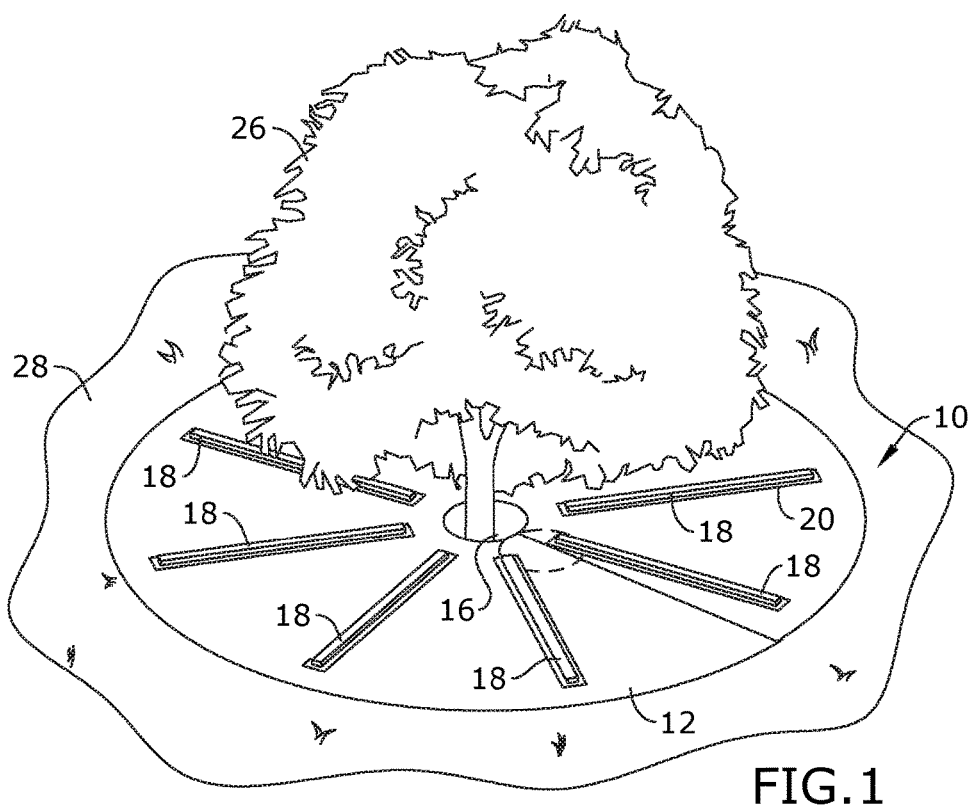
FIG. 1 depicts a perspective view of certain embodiments of the tarp apparatus shown in use.
Figure 2:
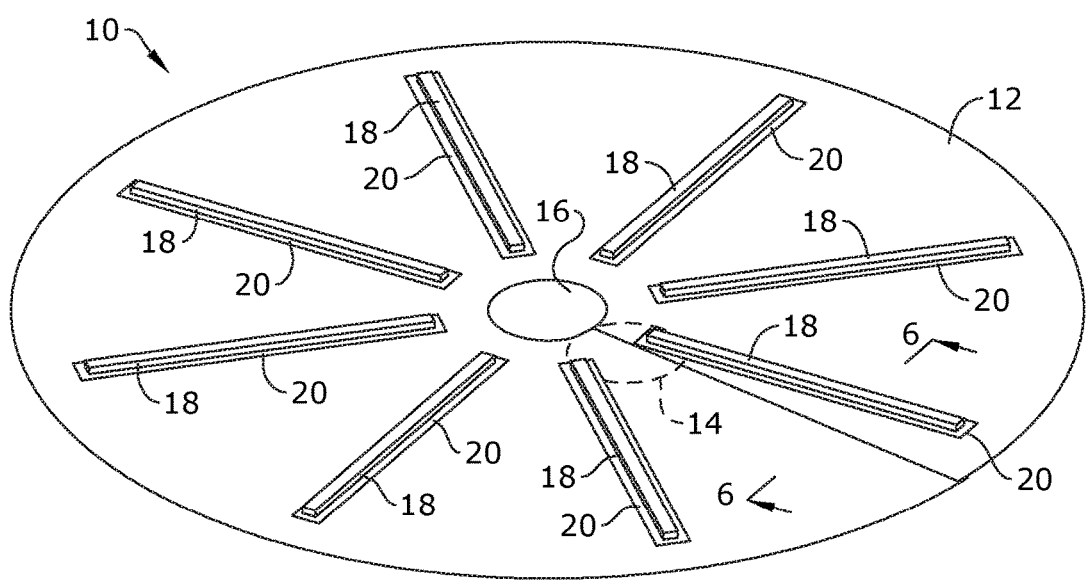
FIG. 2 depicts a perspective view of certain embodiments of the tarp apparatus shown in an unfolded configuration.

As depicted in FIGS. 1-2, tarp apparatus 10 is configured for use with plant 26, which may be a tree, shrub, or the like. Tarp apparatus 10 is disposed on ground 28 and is configured to collect trimmed items (not shown) from plant 26 such as branches, twigs, leaves, and the like. Once the trimmed items fall on the surface of tarp apparatus 10, the apparatus is removed from plant 26 and the trimmed items are disposed accordingly. In certain embodiments of the invention, tarp apparatus 10 generally comprises a circular tarp ring 12 and spine members 18.

Tarp apparatus 10 is preferably made from plastic and comprises a diameter of approximately 9'-10'. In an alternative embodiment, tarp apparatus 10 may be made from a biodegradable material such as thick grade paper, or other similar type material. Tarp apparatus 10 comprises center opening 16, which comprises a circular cutout with a diameter of approximately 12". Circular flap 14 is coupled to the edge of center opening 16 and is configured to cover center opening 16. In one embodiment, circular flap 14 is coupled to approximately 4 inches of the circumference of the edge of center opening 16. Tarp apparatus 10 further comprises a slit that extends from the edge of center opening 16 to an outer edge of circular tarp ring 12.

Figure 6:
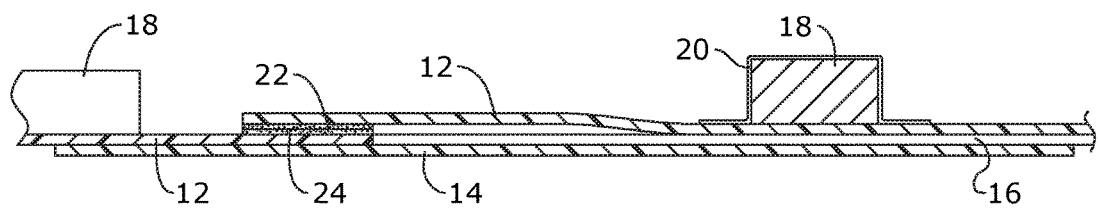
FIG. 6 depicts a section view of certain embodiments of the tarp apparatus taken along line 6-6 in FIG. 2.

As depicted in FIGS. 1-2 and 6, spine members 18 are coupled to the top surface of circular tarp ring 12 by tape 20. In an alternative embodiment, an adhesive or other type of fastener may be used to secure spine members 18 to circular tarp ring 12 instead. Spine members 18 are rods made from plastic, wood, cardboard, or the like, which are configured to provide rigidity, support and stability to tarp apparatus 10. In a preferred embodiment, each spine member 18 extends radially on circular tarp ring 12 and is separated from each adjacent spine member 18 by 45 degrees. In this configuration, eight spine members 18 are evenly spaced throughout circular tarp ring 12 with each spine member 18 being equidistant from other adjacent spine members 18.

Figure 3:
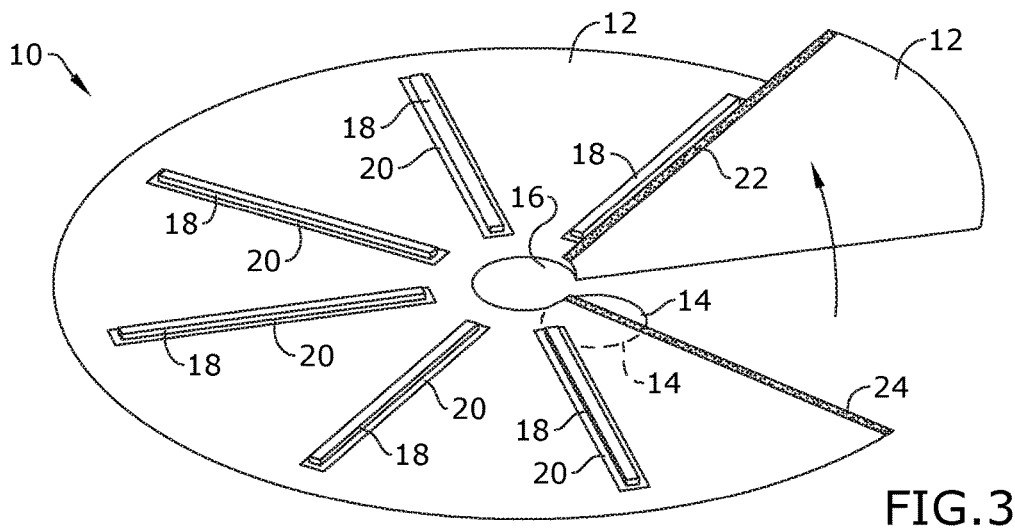
FIG. 3 depicts a perspective view of certain embodiments of the tarp apparatus illustrating the folding of the apparatus.

As depicted in FIGS. 3 and 6, first fastening strip 22 is coupled to a bottom face of tarp apparatus 10 and extends along the slit in circular tarp ring 12. Second fastening strip 24 is coupled to a top face of tarp apparatus 10 and extends along the slit in circular tarp ring 12. First fastening strip 22 and second fastening strip 24 are configured to engage with each other to secure tarp apparatus 10 around the base of plant 26 as shown in FIG. 1. In a preferred embodiment, first fastening strip 22 comprises a plurality of hook fasteners and second fastening strip 24 comprises a plurality of loop fasteners, or vice versa. It shall be appreciated that alternative fastening components may be used in first and second fastening strips 22, 24 such as snap fasteners, slide fasteners, and the like.

In operation, first and second fastening strips 22, 24 are detached to permit tarp apparatus 10 to be disposed on ground 28 and around plant 26. More specifically, tarp apparatus 10 is maneuvered to allow center opening 16 to receive the base of plant 26. First and second fastening strips 22, 24 engage with each other to secure tarp apparatus 10 in place and permit circular tarp ring 12 to cover the area surrounding plant 26 as shown in FIG. 1. In this configuration, spine members 18 provide weighted members that enhance the stability of tarp apparatus 10 and prevent it from being blown away by wind. Branches, twigs, leaves or other trimmed items (not shown) of plant 26 fall down and are collected by tarp apparatus 10.

Figure 4:
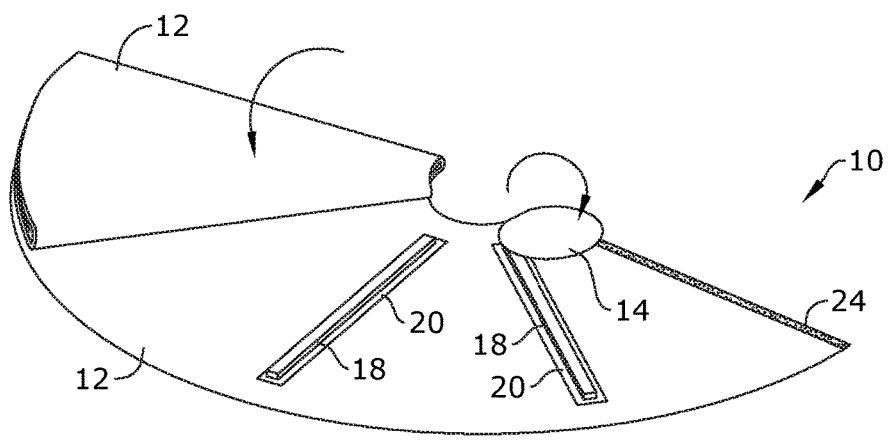
FIG. 4 depicts a perspective view of certain embodiments of the tarp apparatus illustrating the folding of the apparatus.
Figure 5:
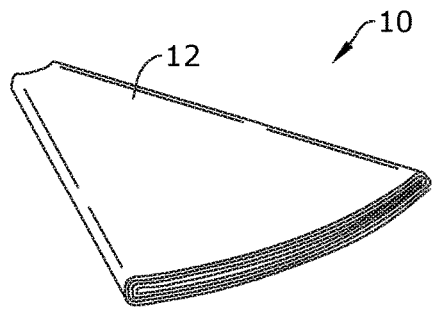
FIG. 5 depicts a perspective view of certain embodiments of the tarp apparatus shown in the folded configuration.

To dispose the trimmed items, first and second fasteners 22, 24 are disengaged and tarp apparatus 10 is pulled away from plant 26. As depicted in FIGS. 3-5, circular tarp ring 12 is folded into a conical shaped member to secure the trimmed items prior to disposal. It shall be appreciated that tarp apparatus 10 may be used in different ways. For example, circular flap 14 may be folded over the pointed end of the conical shaped folded configuration of circular tarp ring 12 and secured in place by additional tape or hook and loop fasteners (not shown) to prevent the captured trimmed items from falling out of tarp apparatus 10. Similarly, additional tape (not shown) may be disposed around the wider base edge opening of the conical shaped folded configuration of circular tarp ring 12 for the same purpose.

The folded tarp apparatus 10 can be placed in a receptacle (not shown) to dispose the collected trimmed items. This is desirable if tarp apparatus 10 is a disposable and biodegradable member made from thick grade paper, or the like. Alternatively, tarp apparatus 10 can be unfolded to dispose the collected items in a receptacle and reused. This is desirable if tarp apparatus 10 is made from a more durable material such as plastic.

It shall be appreciated that the components of tarp apparatus 10 described in several embodiments herein may comprise any alternative known materials in the field and be of any color, size and/or dimensions. It shall be appreciated that the components of tarp apparatus 10 described herein may be manufactured and assembled using any known techniques in the field.

Persons of ordinary skill in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

What is claimed is:

1. A foldable tarp apparatus with enhanced strength for use in covering a ground area surrounding a base of a plant, the tarp apparatus configured to collect trimmed leaves and branches of the plant for a disposal, the tarp apparatus comprising:
    a foldable circular sheet comprising a central opening and an outer edge, the circular sheet comprising a slit extending from an edge of the central opening to the outer edge of the circular sheet; and
    a plurality of spine members coupled to a top surface of the circular sheet and designed to enhance stability of the sheet when disposed on the ground area, each spine member in the plurality of spine members extending radially on the circular sheet and positioned equidistant from adjacent spine members in the plurality of spine members, each spine member in the plurality of spine members comprising a first end positioned a first distance from the outer edge of the circular sheet and a second end positioned a second distance from the edge of the central opening in the circular sheet;
    wherein the circular sheet is disposed on the ground area with the plurality of spine members extending within a single plane to enable the central opening of the circular sheet to receive the base of the plant therethrough, thereby permitting the circular sheet to collect the trimmed leaves and branches of the plant;
    wherein the circular sheet is folded to a conical-shaped member with the plurality of spine members encapsulated within the circular sheet to secure the collected trimmed leaves and branches therein.

2. The foldable tarp apparatus of claim 1, further comprising a circular flap coupled to the edge of the central opening of the circular sheet.

3. The foldable tarp apparatus of claim 2, further comprising a first fastening strip coupled to a bottom face of the circular sheet and extending along the slit and a second fastening strip coupled to a top face of the circular sheet and extending along the slit, wherein the first fastening strip is configured to engage with the second fastening strip.

4. The foldable tarp apparatus of claim 3, wherein the first fastening strip comprises hook fasteners and the second fastening strip comprises loop fasteners.

* * * * *